United States Patent
Gallert et al.

(10) Patent No.: US 11,799,354 B2
(45) Date of Patent: Oct. 24, 2023

(54) CURRENT IMBALANCE FAULT MITIGATION FOR ROTARY ELECTRIC MACHINE WITH PARALLEL STATOR WINDINGS

(71) Applicant: GM GLOBAL TECHNOLOGY OPERATIONS LLC, Detroit, MI (US)

(72) Inventors: Brian J. Gallert, Waterford, MI (US); Stephen M. Garza, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 198 days.

(21) Appl. No.: 17/481,379

(22) Filed: Sep. 22, 2021

(65) Prior Publication Data
US 2023/0087179 A1  Mar. 23, 2023

(51) Int. Cl.
 H02K 7/00 (2006.01)
 H02P 29/028 (2016.01)
 H02K 3/28 (2006.01)
 H02P 29/68 (2016.01)

(52) U.S. Cl.
 CPC .............. *H02K 7/006* (2013.01); *H02K 3/28* (2013.01); *H02P 29/028* (2013.01); *H02P 29/68* (2016.02); *H02K 2213/03* (2013.01)

(58) Field of Classification Search
 CPC combination set(s) only.
 See application file for complete search history.

(56) References Cited

U.S. PATENT DOCUMENTS

| | | | |
|---|---|---|---|
| 9,302,702 B1 * | 4/2016 | Schepmann | B62D 5/065 |
| 10,778,135 B2 | 9/2020 | Koenig et al. | |
| 10,821,816 B1 * | 11/2020 | Chow | B60K 1/04 |
| 11,342,875 B2 * | 5/2022 | Koenig | B64D 27/18 |
| 2016/0025811 A1 * | 1/2016 | Kasztenny | G01R 31/343 324/765.01 |
| 2016/0200355 A1 * | 7/2016 | Mori | H02P 21/22 180/446 |
| 2016/0325777 A1 * | 11/2016 | Mori | H02H 3/044 |
| 2022/0352842 A1 * | 11/2022 | Wang | B60L 53/20 |

FOREIGN PATENT DOCUMENTS

JP  2004328899 A  * 11/2004

* cited by examiner

*Primary Examiner* — Bickey Dhakal
(74) *Attorney, Agent, or Firm* — Quinn IP Law (57) ABSTRACT

An electric powertrain system includes an electric machine having a rotor and stator. The stator has multiple phase legs, each respective one of which includes a single phase lead connected to two or more parallel stator windings. The stator thus has multiple phase leads collectively conducting phase currents. A rotary output member is connected to the rotor and connectable to a load. A traction power inverter module (TPIM) is electrically connected to the phase legs. Current sensors collectively measure the phase currents. Each respective current sensor is connected to a different phase lead. A controller in communication with the current sensors and the TPIM, in response to a commanded current and the measured phase currents, detects a threshold variation in the measured phase currents indicative of a phase current imbalance fault, and selectively changes a thermodynamic state of the electrified powertrain in response to the fault.

20 Claims, 5 Drawing Sheets

CURRENT IMBALANCE FAULT MITIGATION FOR ROTARY ELECTRIC MACHINE WITH PARALLEL STATOR WINDINGS

INTRODUCTION

An electric powertrain system typically includes a voltage bus and one or more rotary electric machines and other electrical components connected thereto. When the electric machine embodies an electric traction motor, e.g., a propulsion motor connected to a mobile chassis of a motor vehicle, robot, or another mobile platform, output torque from the energized traction motor is directed to one or more road wheels arranged with respect to the chassis. In some configurations, the electric machine may receive an input torque from an internal combustion engine or another prime mover, such that the electric machine selectively operates as an onboard electric generator. In the exemplary use case of vehicular propulsion, the voltage bus is connected to an onboard direct current (DC) voltage supply, typically a rechargeable lithium-ion propulsion battery pack having an application-suitable number of electrochemical battery cells.

Rotary electric machines configured for use in automotive propulsion and other high-power applications are frequently embodied as polyphase/alternating current (AC) devices having a wound stator and a magnetic rotor. In some configurations, each individual phase leg of the stator employs multiple conductive windings, arranged in parallel. Benefits of a parallel winding arrangement include added hardware redundancy, limited electrical losses, and improved high-frequency performance relative to using a single stator winding per phase leg. When using an AC traction motor or electric generator with the DC voltage bus, a traction power inverter module (TPIM) is used to convert a DC voltage into a polyphase/AC output voltage and vice versa. In this manner and in different operating modes, the TPIM outputs an AC voltage suitable for energizing the stator windings when imparting rotational forces to the rotor, and a DC voltage suitable for recharging the DC voltage supply.

SUMMARY

The present disclosure pertains to the real-time operational control of an electrified powertrain system having at least one polyphase/alternating current (AC) electric machine, with a wound stator of the electric machine having parallel stator windings. In particular, the present disclosure relates generally to methods and associated hardware solutions for detecting phase current imbalance faults as described below, also referred to herein as winding imbalance faults, as well as to execute appropriate control actions to help mitigate undesirable effects of such faults. While the electric machine is exemplified herein as an electric traction motor for powering propulsion functions aboard a motor vehicle, the present teachings may be applied as well to parallel winding electric generators or dual-function motor-generator units without limitation, as will be appreciated by those of ordinary skill in the art. Likewise, while a motor vehicle is described herein for consistency as a representative application benefitting from the present teachings, other mobile or stationary systems employing parallel winding motors may be used in other embodiments.

As the stator of a parallel winding motor ages, one or more of the parallel current paths through the stator may break due to weakened, aged, or degraded welds, temperature effects, and other possible factors. If a given stator winding is severed, the resulting open-circuit condition results in redirection of the phase current on the faulted phase leg to the remaining intact windings. The equivalent resistance of the faulted phase leg increases, which in turn results in increased electrical losses. Although a parallel winding motor experiencing a severed winding will continue to function for a time, albeit in a partially degraded state, the fault will tend to accelerate the aging process due to the extra current load on the remaining/intact stator windings. The present method and associated controller and sensor hardware are therefore configured to detect such phase current imbalance faults during operation of the electric machine. The controller thereafter executes one or more thermodynamic control actions and/or maintenance alert actions in response to the detected phase current imbalance fault as set forth in detail below.

In a particular exemplary embodiment, an electric powertrain system includes a controller and a rotary electric machine, with the latter having a rotor and a stator. The stator has multiple phase legs, e.g., nominal "abc" or "uvw" phases of a representative 3-phase electric traction motor. Each respective phase leg includes a single phase lead connected to two or more parallel stator windings. The stator thus has a multiple phase leads that equals the number of electrical phases, e.g., three phase leads for a 3-phase taction motor. The phase leads collectively conduct a set of phase currents. A rotary output member is connected to the rotor and connectable to a load, e.g., a road wheel in a non-limiting motor vehicle implementation. Additionally, a traction power inverter module (TPIM) is electrically connected to each respective one of the phase leads, with a plurality of current sensors collectively measuring the phase currents, one current sensor per phase lead, and outputting the same as measured phase currents.

As part of this exemplary embodiment, the controller is in communication with the current sensors and the TPIM, and is configured, in response to a commanded current and the measured phase currents, to detect a threshold variation in the measured phase currents indicative of a phase current imbalance fault. In response to detection of such a fault, the controller may change a thermodynamic state of the electric powertrain system, with the term "thermodynamic" as used herein meaning (i) a regulated temperature of the electrified powertrain system or components thereof, (ii) a dynamic output state of the electric machine such as output torque and/or speed, or (iii) both the temperature and the dynamic output state. The controller may likewise record a diagnostic code indicative of the phase current imbalance fault, either as a sole control action for relatively minor faults, or in conjunction with changing the thermodynamic state for more severe faults.

The commanded current in some embodiments includes a direct axis (d-axis) current command and a quadrature axis (q-axis) current command, both of which are generated by the controller in performing its customary motor control actions. The controller in such an embodiment detects the threshold variation(s) as a function of the d-axis current command, the q-axis current command, and the measured phase currents.

In a non-limiting implementation, the function includes a unitless modulus value that seeks to normalize the d-axis current command, the q-axis current command, and the measured phase currents. For example, the modulus value may be expressed mathematically as:

$$\text{Modulus} = \left| 1 - \frac{\sqrt{2}}{\sqrt{3}} \frac{\sqrt{I_a^2 + I_b^2 + I_c^2}}{\sqrt{I_{d\_Cmd}^2 + I_{q\_Cmd}^2}} \right|$$

In such a formulation, the electric machine has three phase legs/phase leads for nominal abc electrical phases in a representative 3-phase electric traction motor embodiment, the values $I_a$, $I_b$, and $I_c$ are the measured phase currents, and $I_{d\_Cmd}$ and $I_{q\_Cmd}$ are the d-axis command and the q-axis command, respectively.

The controller may optionally detect threshold variations in the measured phase currents by comparing the threshold variations to multiple different thresholds of increasing fault severity. The controller in such an implementation may also change the thermodynamic state of the electrified powertrain system in a manner corresponding to the increasing fault severity.

A coolant pump may be included in the construction of the electric powertrain system. Such a coolant pump is configured to circulate a heat transfer fluid to the electric machine, as well as the TPIM and possibly other components such as a DC propulsion battery pack. The multiple different thresholds may include a first threshold, with the controller selectively increasing a rotary speed of the coolant pump in response to the threshold variation exceeding the first threshold. The multiple different thresholds may also include a second threshold that exceeds the first threshold, with the controller selectively derating the electric machine via switching control of the TPIM when the threshold variation exceeds the second threshold.

In another aspect of the present disclosure, the electric machine includes separate first and second electric machines. The controller identifies, as a faulted motor, which one of the first or second electric machine is experiencing the threshold variation, and then selectively reduces a torque capability of the faulted motor in response to the threshold variation. The load may include a road wheel of a motor vehicle, in which case the controller may be configured to apply torque vectoring of the non-faulted motor, i.e., the particular first or second electric machine not experiencing the imbalance fault, to maintain a minimal wheel slip level of the road wheel.

The two or more parallel stator windings in a possible embodiment includes at least eight parallel stator windings for each respective one of the multiple phase leads.

Also disclosed herein is a method for detecting a threshold variation in measured phase currents of an electric machine having a parallel-wound stator disposed with respect to a rotor. As noted above, the threshold variation is indicative of the above-noted phase current imbalance fault. The method according to an exemplary embodiment includes measuring the phase currents using a plurality of current sensors, each respective one of the current sensors being connected to a corresponding single phase lead of the stator such that the stator has multiple phase leads. The multiple phase leads are respectively connected to two or more parallel stator windings. The method further includes detecting the threshold variation across the measured phase currents, via a controller, in response to a commanded current and the measured phase currents, and then changing a thermodynamic state of the electrified powertrain via the controller in response to the detected phase current imbalance fault.

A computer-readable medium is also disclosed herein. Instructions for detecting a threshold variation in measured phase currents of a polyphase electric machine are recorded on the computer-readable medium. The electric machine has a parallel-wound stator disposed with respect to a rotor. The threshold variation is indicative of a phase current imbalance fault. Execution of the instructions by a processor of a computer device causes the processor to receive the measured phase currents from a plurality of current sensors, with each respective current sensor being connected to a corresponding single phase lead of the stator. The stator has multiple phase leads, each of which is respectively connected to two or more parallel stator windings.

Execution of the instructions also causes the controller to detect the threshold variation across the measured phase currents. Detection may occur during a predetermined testing interval, e.g., steady-state operation of the electric machine at a predetermined speed, in response to a commanded current and the measured phase currents. The controller then changes a thermodynamic state of the electric powertrain system in response to the phase current imbalance fault, including increasing a rotary speed of a coolant pump in fluid communication with the electric machine and/or derating the electric machine via switching commands to a TPIM connected to the stator via the multiple phase leads.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Figure 1:
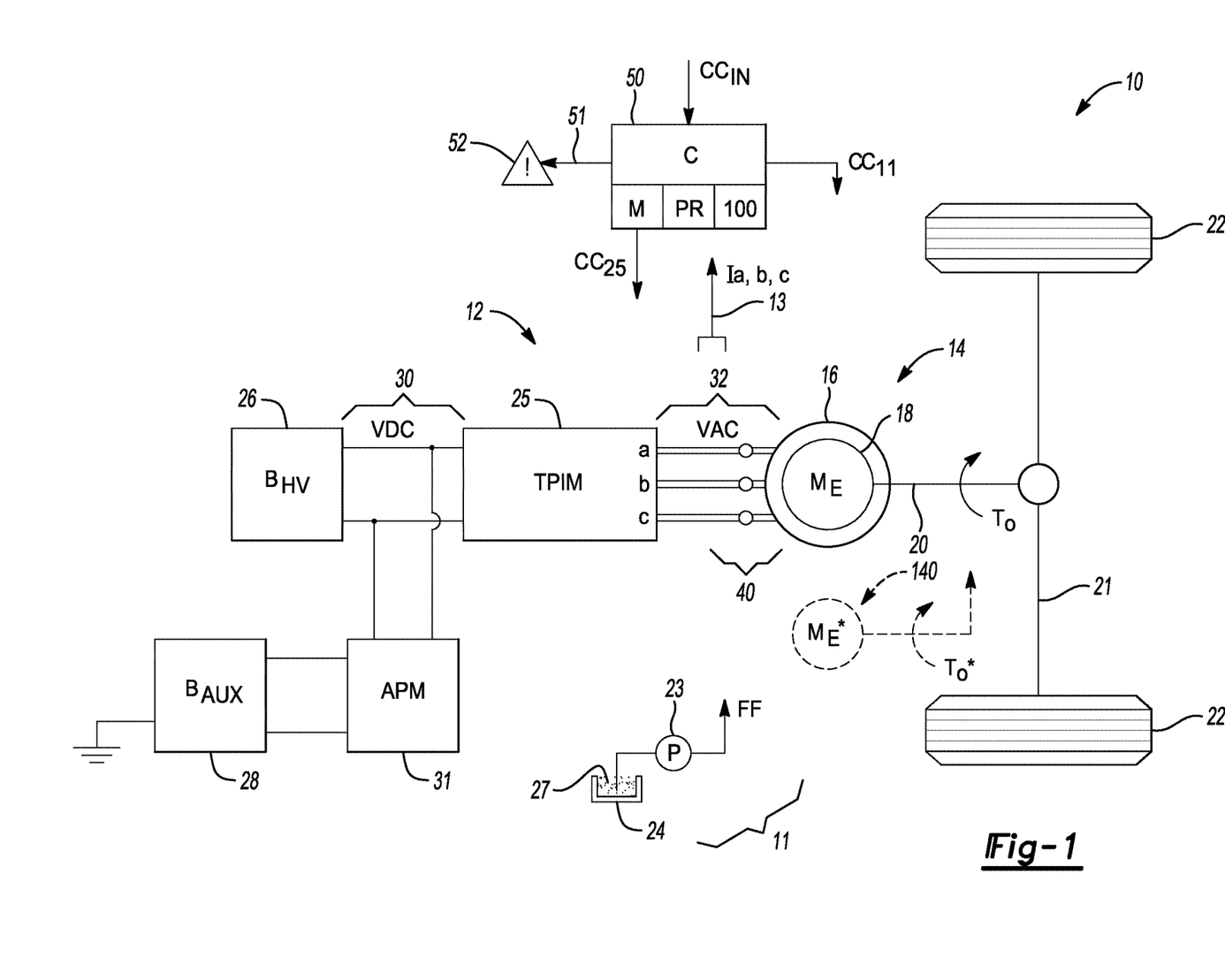
FIG. 1 is a schematic illustration of a representative electric powertrain system having a polyphase rotary electric machine with parallel stator windings, and a controller programmed to detect a phase current imbalance fault in accordance with the present disclosure.

Referring to the drawings, wherein like reference numbers refer to like features throughout the several views, and beginning with FIG. 1, an electric powertrain system 12 configured as set forth herein may be used aboard a motor vehicle 10, or as part of another mobile platform such as a watercraft, an aircraft, a rail vehicle, etc. In the depicted representative embodiment, the motor vehicle 10 includes multiple road wheels 22 in rolling contact with a road surface. The actual number of road wheels 22 may vary with the application, with as few as one road wheel 22 being possible, for instance in the context of a motorcycle, scooter, or e-bike, and with more than the illustrated number of road wheels 22 being possible in other configurations. The present teachings may be applied to other vehicular and non-vehicular applications, including stationary applications, and therefore the motor vehicle 10 of FIG. 1 is intended to illustrate just one possible use of the electric powertrain system 12. Thus, references below to the motor vehicle 10 and road wheels 22 are solely for illustrative consistency, and are not intended to limit the scope of applications to the representative embodiment of FIG. 1.

As described in detail herein with reference to FIGS. 2-5, the electric powertrain system 12 includes an electronic controller (C) 50 configured to detect and mitigate a phase current imbalance fault occurring within the electric powertrain system 12. As part of this effort, the controller 50 receives a collective set of input signals (arrow $CC_{IN}$). The input signals (arrow $CC_{IN}$) as contemplated herein include a commanded current, e.g., a direct axis (d-axis) current and quadrature axis (q-axis) current in a possible implementation, and a set of measured phase currents 13. For clarity, the measured phase currents 13 are labeled individually with arrows $I_a$, $I_b$, and $I_c$ for a non-limiting representative 3-phase embodiment having nominal a, b, and c electrical phases, as appreciated by those skilled in the art. The controller 50 responds to the input signals (arrow $CC_{IN}$) by detecting one or more threshold variations in the measured phase currents 13, with such variations being indicative of the particular phase current imbalance faults addressed in the present disclosure.

In addition to detecting phase current imbalance faults, the controller 50 also responds to detected faults by recording a diagnostic code indicative of the existence of the detected fault, and by selectively changing a thermal and/or dynamic ("thermodynamic") state of the electric powertrain system 12 based on fault severity. Such control actions may be performed by transmitting an alert signal (arrow 51) to an indicator device ("!") 52, such as by sending a text message, illuminating a dashboard indicator lamp, and/or providing another suitable audio and/or visual alert drawing an operator's attention to the presence of the phase current imbalance fault, as well as to the possible need for scheduling corrective maintenance. Additional control actions may include transmitting a thermal control signal (arrow $CC_{11}$) to a thermal management system 11 and/or transmitting inverter control signals (arrow $CC_{25}$) to a traction power inverter module (TPIM) 25 of the electric powertrain system 12, with both control actions described in further detail below.

The electric powertrain system 12 shown in FIG. 1 includes at least one rotary electric machine 14 having a parallel-wound stator 16 and a magnetic rotor 18. In the illustrated radial flux-type configuration of the electric machine 14, the rotor 18 is disposed radially within the stator 16 and separated therefrom by a small radial airgap (not shown). In other possible configurations, the stator 16 may be surrounded by the rotor 18 or the electric machine 14 may be an axial flux-type machine, without departing from the scope of the disclosure. Likewise, the particular construction of the rotor 18 may vary based on the configuration of the electric machine 14, with permanent magnet or induction rotors being possible embodiments.

In the exemplary embodiment of the electric powertrain system 12, the electric machine 14 is a polyphase/alternating current (AC) traction motor used for generating output torque (arrow $T_O$), which in turn is harnessed and directed, via a rotary output member 20 connected to the rotor 18, to a coupled load. When used as a traction motor aboard the motor vehicle 10, for example, the coupled load may include one or more of the road wheel(s) 22, or a drive axle 21 coupled thereto. The rotary output member 20 may be variously embodied as a rotatable gear set, a shaft, or another suitable mechanical coupling mechanism. The road wheels 22 in the illustrated use case of the motor vehicle 10 may be configured as front or rear road wheels 22 in different embodiments. Likewise, while the present teachings are presented in the context of a single electric machine 14 for illustrative simplicity and clarity, at least one additional electric machine 140 ($M_E^*$) may be present, with the additional electric machine 140 generating an output torque (arrow $T_O^*$), e.g., to another drive axle (not shown), or to a particular road wheel(s) 22 in different embodiments.

In keeping with the simplified 3-phase embodiment, an AC-side of the TPIM 25 has three corresponding phases, nominally a, b, and c electrical phases as appreciated in the art, or u, v, and w phases using different labeling conventions. An AC voltage bus 32 provides an AC voltage (VAC) to the stator 16, with the measured phase currents 13 provided by a plurality of current sensors 40 as part of the above-noted input signals (arrow $CC_{IN}$). Power is supplied to the TPIM 25 by a direct current (DC) voltage bus 30, which carries a DC voltage (VDC) and is connected to an onboard DC voltage supply 26, in this instance an exemplary rechargeable lithium-ion battery pack ($B_{HV}$). As the voltage capability of the DC voltage supply 26 is typically much higher than auxiliary 12-15V auxiliary voltage levels, e.g., 60V-300V or more, the electric powertrain system 12 may be equipped with an auxiliary power module (APM) 31 in the form of a DC-to-DC converter, which in turn is connected to a 12-15V auxiliary battery 28 ($B_{AUX}$), typically a lead-acid battery.

Still referring to FIG. 1, the thermal management system 11 may include a coolant pump (P) 23. In order to regulate temperature of the electric machine 14 and other components of the electric powertrain system 12, including the TPIM 25, the APM 31, the DC voltage supply 26, etc., the coolant pump 23 draws heat transfer fluid 27 from a sump 24 and circulates the heat transfer fluid 27 through the various components as a coolant flow (arrow FF). Although omitted from FIG. 1 for illustrative simplicity, those skilled in the art will appreciate that various devices may be placed in fluid communication with the coolant pump 23 to receive the coolant flow (arrow FF) for the purpose of thermal regulation, including but not necessarily limited to cooling fins, conductive cooling plates, and the like.

Figure 2:
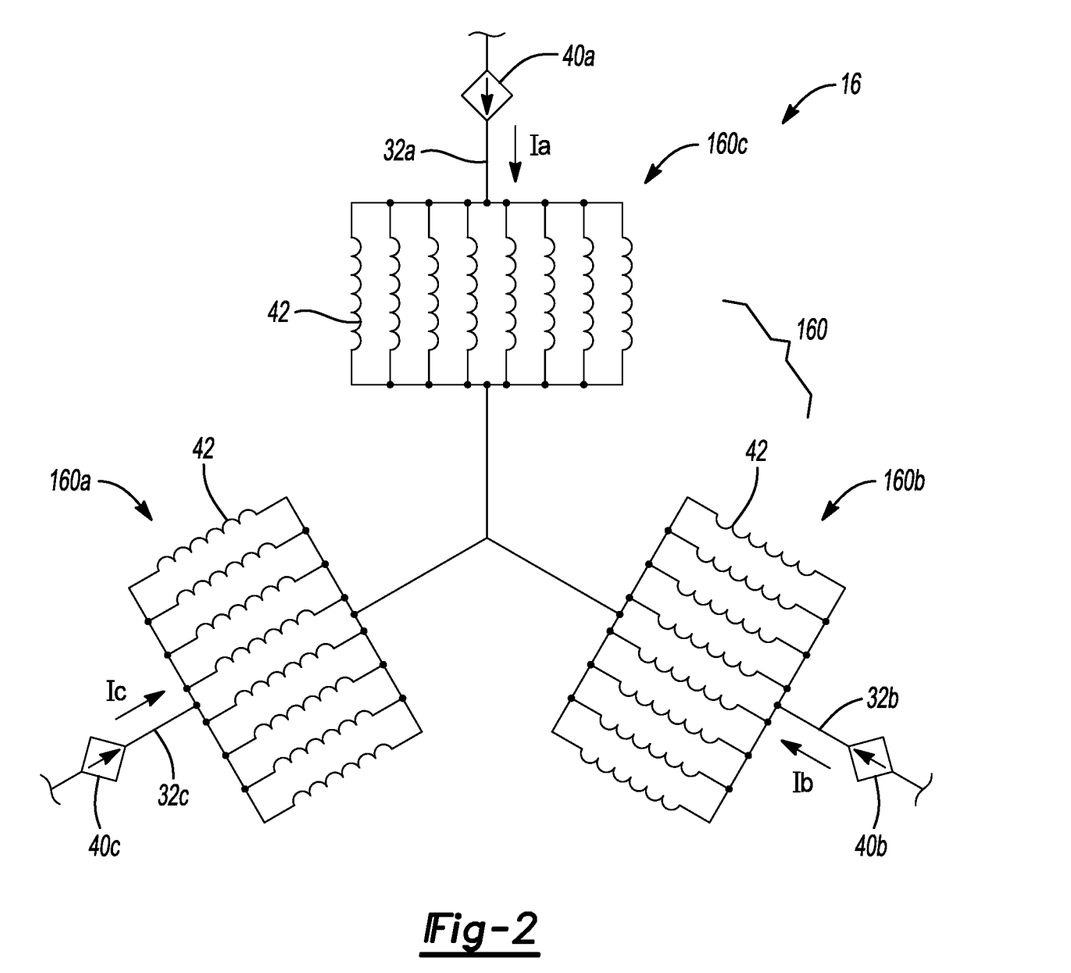
FIG. 2 is a depiction of representative parallel windings of the polyphase motor shown in FIG. 1 according to a possible embodiment.

Referring briefly to FIG. 2, the present teachings are directed to detecting phase current imbalance faults in the stator 16. To that end, the stator 16 has multiple phase legs 160, which are individually labeled 160a, 160b, and 160c for a simplified exemplary 3-phase embodiment with nominal a, b, and c phases. Each respective one of the multiple phase legs 160 includes a single phase lead 32a, 32b, or 32c connected to two or more parallel stator windings 42, such that the stator 16 has multiple phase leads collectively conducting the phase currents (arrows $I_a$, $I_b$, and $I_c$). To ensure proper delivery of the phase currents, the TPIM 25 of FIG. 1 is connected to the stator 16 via the phase leads 32a, 32b, and 32c.

As part of the control hardware used for performing the present method 100, a plurality of current sensors 40 (FIG. 1), shown as 40a, 40b, and 40c in FIG. 2 for the respective a, b, and c electrical phases, collectively measures the phase currents (arrows $I_a$, $I_b$, and $I_c$). Each respective current sensor 40a, 40b, 40c is connected to a different respective one of the phase leads 32a, 32b, or 32c. In other words, the current sensor 40a is connected to the phase lead 32a, the current sensor 40b is connected to the phase lead 32b, and the current sensor 40c is connected to the phase lead 32c.

Referring again to FIG. 1, the controller 50 is in communication with the current sensors 40a, 40b, and 40c of FIG. 2, as well as the TPIM 25. In response to a commanded current and the measured phase currents 13, the controller 50 detects a threshold variation in the measured phase currents 13 indicative of the noted phase current imbalance fault, and also to selectively change a thermodynamic state of the electric powertrain system 12 in response to detecting such a fault. To that end, the controller 50 is configured to execute instructions embodying the present method 100, with an exemplary/non-limiting embodiment of the method 100 described below with reference to FIG. 5. Performance of the method 100 enables the controller 50 to intelligently evaluate, at a collective level, a state of equivalence or "balance" of the individual phase currents energizing the stator 16. The present solution is characterized by measurement and use of measured phase currents 13 as such currents pass through the respective phase leads 32a, 32b, and 32c, as opposed to individually measuring current conducted by each constituent one of the stator windings 42 of FIG. 2. While hardware-intensive solutions utilizing winding-specific current sensing may have certain advantages in critical applications, particularly those in which a very limited number of stator windings are present per phase leg, the added cost and computational load associated with the use of such hardware is often cost prohibitive in other applications, particularly those having large redundancy in the number of available stator windings 42.

One such configuration is that shown in FIG. 2, which depicts an embodiment of the stator 16 employing eight of the stator windings 42 for each electrical phase. While more or fewer stator windings 42 could be used in other configurations, the increased number of stator windings 42 used in parallel for a given electrical phase, and the resulting ability of the electric machine 14 to continue to function at a high level by feeding a given phase current through redundant conductive paths, lends the method 100 to beneficial uses in vehicular propulsion systems and other uses, while at the same time reducing cost and processing power typically associated with winding disparity measurements and associated analysis.

For the purposes of executing the present method 100, the controller 50 is equipped with application-specific amounts of the volatile and non-volatile memory (M) and one or more of processor(s) (PR), e.g., microprocessors or central processing units, as well as other associated hardware and software, for instance a digital clock or timer, input/output circuitry, buffer circuitry, Application Specific Integrated Circuits (ASICs), systems-on-a-chip (SoCs), electronic circuits, and other requisite hardware as needed to provide the programmed functionality. In the context of the present disclosure, the controller 50 executes instructions via the processor(s) (PR) to cause the controller 50 to perform the method 100.

In doing so, the controller 50 may use the inverter control signals (arrow $CC_{25}$) to modulate a voltage delivered to gate control pins (not shown) of the TPIM 25 for control of the torque and/or speed of the electric traction motor 14. That is, depending on the state of the imbalance fault, the controller 50 may elect to derate the electric machine 14 using corresponding switching control actions of the TPIM 25, i.e., ON/OFF state control of constituent IGBTs or other resident semiconductor switches thereof, as appreciated in the art. Execution of the method 100 may ultimately include controlling a switching output state of the TPIM 25, and as a result, a dynamic output state of the electric traction motor 14. Likewise, the controller 50 may respond to the detected phase current imbalance fault by temporarily increasing a rotary speed of the coolant pump 23 of FIG. 1, possibly in lieu of, prior to, or concurrently with automatic derating the electric machine 14. Different possible control actions in accordance with such a configuration are described below with particular reference to FIG. 5.

Figure 3A:
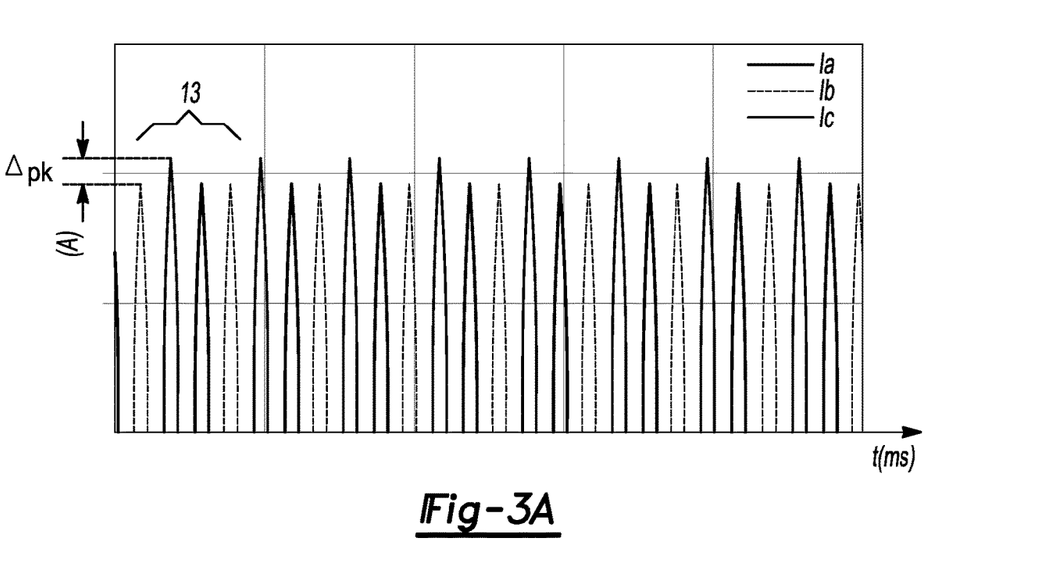
FIGS. 3A and 3B are representative plots of measured phase currents for a baseline parallel-wound stator and representative defective variations thereof, respectively.
Figure 3B:
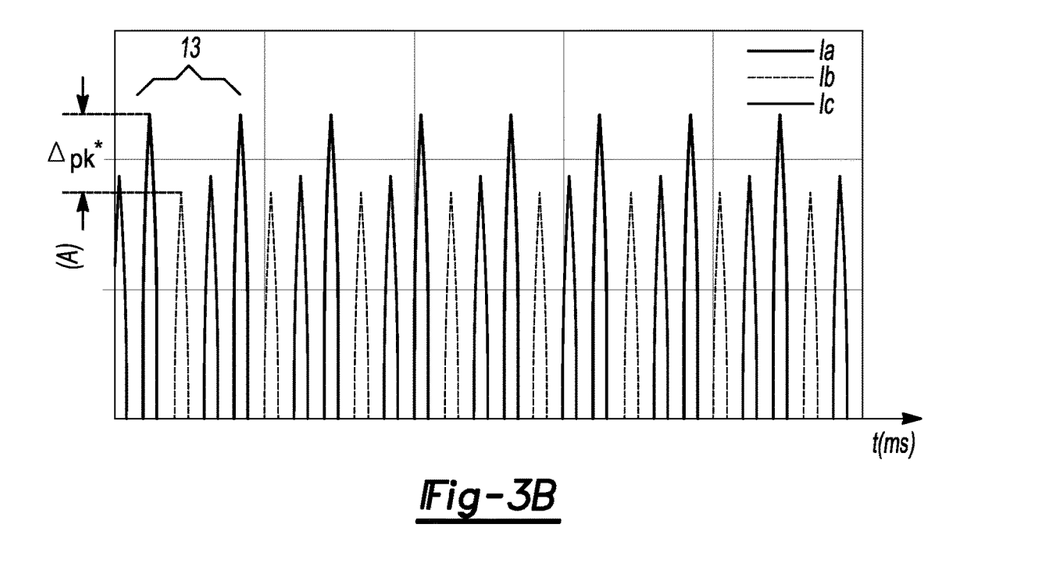

Referring now to FIGS. 3A and 3B, plots 60 and 62 respectively depict representative sets of the measured phase currents 13, once again labeled $I_a$, $I_b$, and $I_c$ for an exemplary 3-phase configuration using the nominal abc phase convention, with amplitude (A) represented on the vertical axis and time in milliseconds, i.e., t(ms), represented on the horizontal axis. As shown in plot 60 of FIG. 3A, a peak difference ($\Delta_{pk}$) is observed between the largest of the three phase currents, in this instance the phase current $I_c$, and the smallest of the phase currents, i.e., $I_a$ or $I_b$, which are depicted in FIG. 3A as being approximately equal. When the peak difference ($\Delta_{pk}$) is effectively negligible, as determined by the present solution, the measured phase currents 13 are said to be effectively balanced within the scope of the present disclosure. For example, one may consider the measured phase currents 13 to be balanced when within +/−2% of each other, or within another application-specific window.

In contrast, a peak difference ($\Delta_{pk}^*$) as shown in plot 62 of FIG. 3B illustrates a representative phase current imbalance condition detectable via the method 100. Plot 62 illustrates a scenario in which the phase current $I_a$ is substantially higher than each of the other two phase currents $I_b$ and $I_c$. Thus, the increased magnitude of the peak difference ($\Delta_{pk}^*$) relative to the peak difference ($\Delta_{pk}$) may be indicative of the presence of an open-circuit state on one or more of the stator windings 42 (see FIG. 2).

Unlike diagnostic strategies that seek to measure the current flow on each stator winding 42 of each respective electrical phase, the present approach may perform unitless calculations using the collectively measured current data of FIGS. 3A and 3B, as well as commanded currents. With respect to commanded currents, the dq frame of reference is used for single-phase representation of the relative flux contribution of a sinusoidal 3-phase current. The direct axis ("d-axis") is the particular axis along which magnetic flux is produced by the field windings of the electric machine 14. The quadrature axis ("q-axis") is perpendicular to the d-axis.

Thus, an associated motor control processor (not shown) of a polyphase motor such as the electric machine 14, and the optional additional electric machine 140, may receive a commanded current in the form of a d-axis current command and a q-axis current command. In some embodiments, therefore, the controller 50 is configured to detect the threshold variation as a function of the d-axis current command, the q-axis current command, and the measured phase currents 13.

In a representative implementation, the above-noted function includes a unitless modulus value that normalizes the d-axis current command, the q-axis current command, and the measured phase currents 13. The unitless modulus value ("Modulus") may be expressed as:

$$\text{Modulus} = \left| 1 - \frac{\sqrt{2}}{\sqrt{3}} \frac{\sqrt{I_a^2 + I_b^2 + I_c^2}}{\sqrt{I_{d\_Cmd}^2 + I_{q\_Cmd}^2}} \right|$$

wherein the electric machine 14 has three of the multiple phase legs, $I_a$, $I_b$, and $I_c$ are the measured phase currents 13, and $I_{d\_Cmd}$ and $I_{q\_Cmd}$ are the above-mentioned d-axis command and the q-axis command, respectively.

Figure 4A:
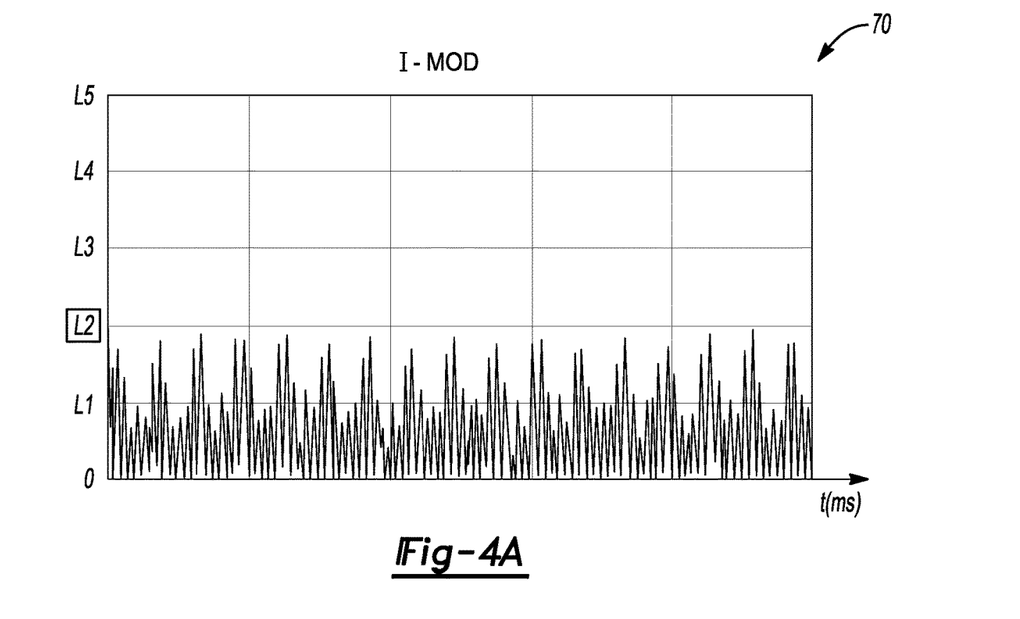
FIGS. 4A and 4B are plots of a baseline unitless current modulus value corresponding to the parallel wound stators whose relative performances are shown in FIGS. 3A and 3B, respectively.

As shown in plot 70 of FIG. 4A, which depicts time in milliseconds t(ms) on the horizontal axis and a unitless magnitude or level (L1, L2, L3, L4, L5) on the vertical axis, one may set the unitless modulus value (I-MOD) to a default threshold level, e.g., level L2, and then monitor the modulus value over time to detect periods over which the modulus value exceeds the default threshold level. For example, if level L2 is the default threshold as indicated by the box that is drawn around L2, the controller 50 of FIG. 1 may allow the electric powertrain system 12 to operate according to programmed normal operating limits, i.e., without derating the electric machine 14 via the TPIM 25, provided the modulus value remains between 0 and L2, e.g., 0.02-0.03 or some other low non-zero value. The phase current imbalance fault is then detected by the present method 100 when the default threshold level is exceeded, with such an undesirable result depicted in plot 72 of FIG. 4B.

Figure 4B:
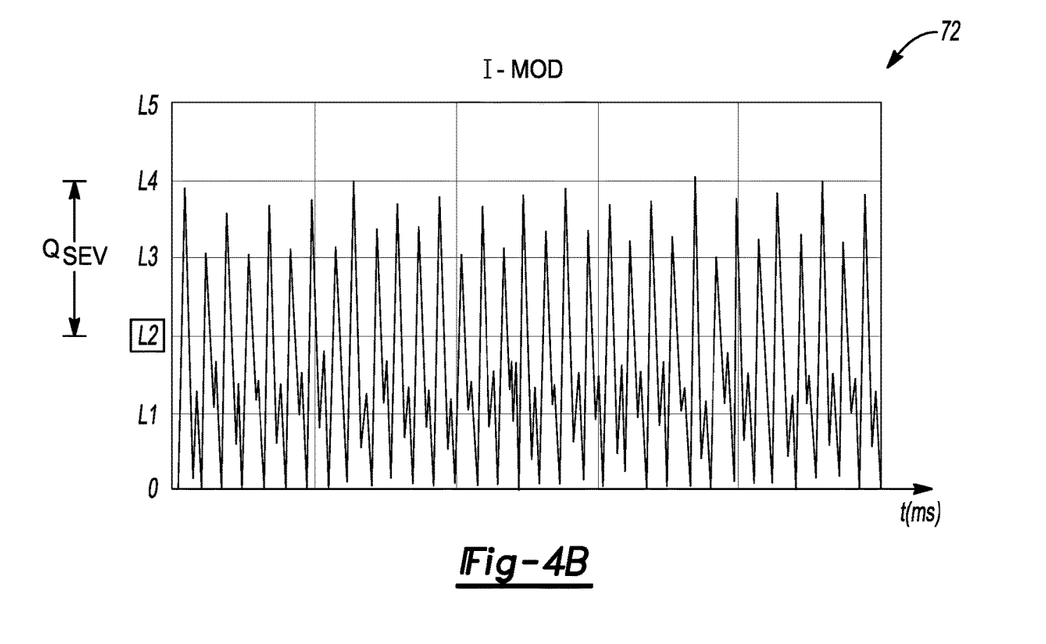

In some implementations of the present teachings, the controller 50 detects a threshold variation in the measured phase currents 13 of FIG. 1 by comparing the calculated unitless modulus value to multiple different thresholds of increasing fault severity, as indicated by double-headed arrow $Q_{SEV}$ in FIG. 4B. The controller 50 could change the thermodynamic state of the electrified powertrain system 12 in a manner corresponding to the increasing fault severity as a possible control action. For example, the controller 50 could execute a control action, such as increasing cooling of the electric powertrain system 12 and/or recording a diagnostic code, when the modulus value exceeds threshold level L2, with the controller 50 taking a more aggressive approach when the modulus value exceeds a higher threshold level, e.g., L3.

More aggressive control actions such as derating the electric machine 14 via operation of the TPIM 25 could selectively occur when the modulus value exceeds a higher level, such as when the modulus value falls between L3 and a higher level, e.g., L4. Although FIG. 4B illustrates a phase current imbalance fault in which the modulus value does not exceed nominal level L4, those skilled in the art will appreciate that additional escalating control actions could be taken at still higher levels, e.g., level L5, with the actual corresponding value of each of the threshold levels L1-L5 being tunable to a particular construction of the electric powertrain system 12. That is, while in an illustrative embodiment each increment is about 0.01, i.e., L1=0.01, L2=0.02, . . . , L5=0.05, other values may be used in other embodiments, within the scope of the present disclosure. Likewise, embodiments may be envisioned in which adjustments could be made to the rotary speed of the pump 23 of FIG. 1 and derating of the electric machine 14 via the TPIM 25 for each successively-exceeded threshold level, such as by weighting cooling intervention over derating actions when the fault severity remains low, up to a maximum possible cooling level, and then prioritizing derating efforts when the fault severity is relatively high.

Figure 5:
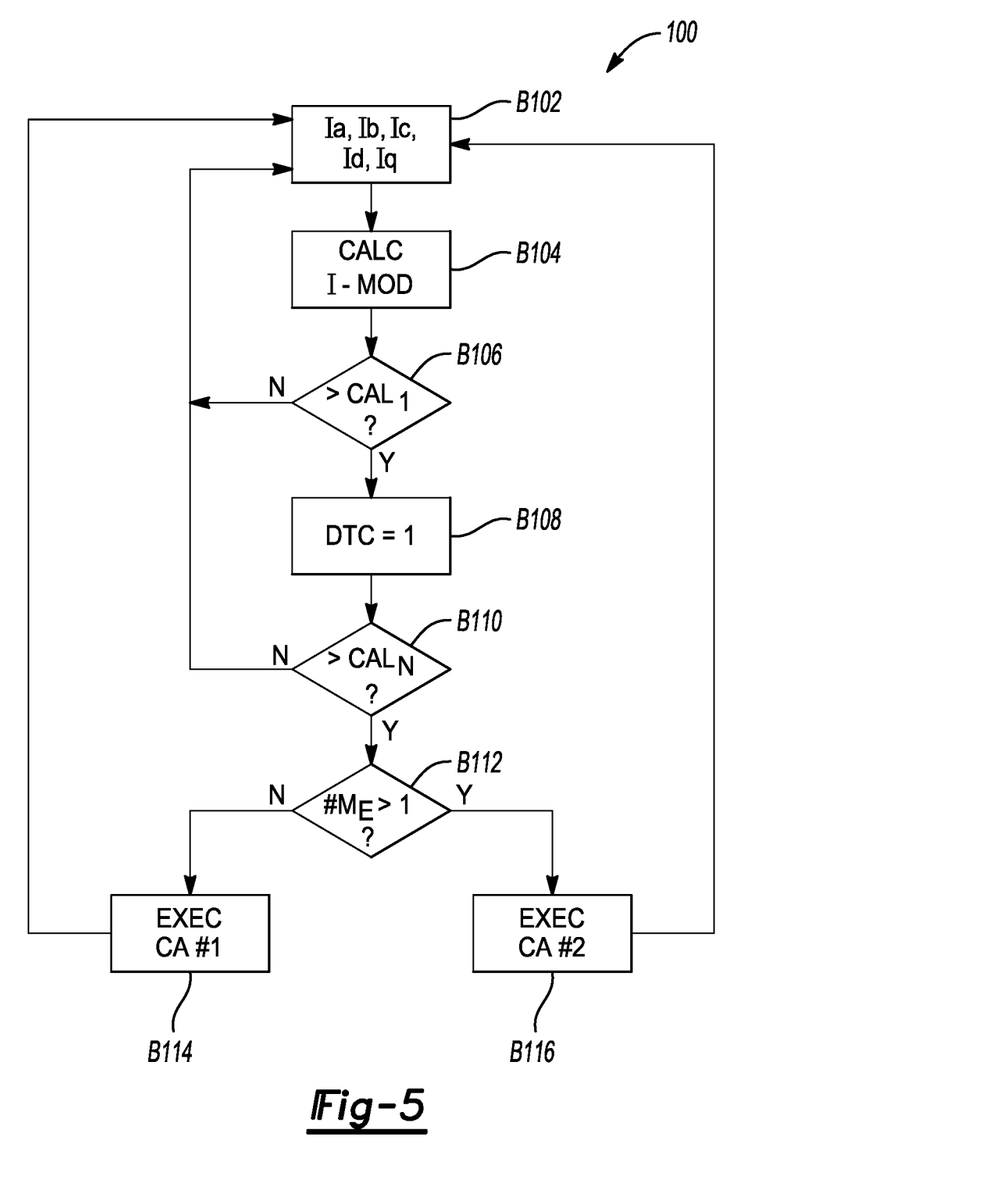
FIG. 5 is a flow chart describing an embodiment of the present method.

Referring to FIG. 5, the method 100 is executed by the constituent hardware and software of the controller 50 of FIG. 1 when detecting a threshold variation in the measured phase currents 13 of the electric machine 14, the latter having a parallel-wound stator 16 disposed with respect to a rotor 18 as shown in FIGS. 1 and 2. The method 100 according to an exemplary embodiment commences at block B102 with measuring the phase currents $I_a$, $I_b$, and $I_c$ via the current sensors 40. As noted above, each respective current sensor 40 is connected to a corresponding single phase lead 32a, 32b, or 32c of the stator 16, such that the stator 16 has multiple phase leads. The multiple phase leads are respectively connected to two or more parallel stator windings 42 as best shown in FIG. 2. The method 100 proceeds to block B104 after the controller 50 has determined the measured phase currents 13.

Block B104 in this non-limiting exemplary embodiment includes calculating the unitless modulus value ("CALC I-MOD), e.g., a unitless value normalizing the d-axis current command, the q-axis current command, and the measured phase currents 13 as set forth above. The end result of block B104 is effectively a DC value that, ideally, approaches zero, indicating balanced winding currents. The method 100 then proceeds to block B106.

At block B106, the controller 50 next detects a threshold variation across the measured phase currents 13 in response to the commanded current, e.g., the d-axis and q-axis currents, and the measured phase currents 13. This occurs by comparing the unitless modulus value from block B104 to a first threshold level (">CAL$_1$"). The method 100 repeats block B102 when the modulus value is less than the first threshold level of CAL$_1$, e.g., level L2 of FIGS. 4A and 4B. The method 100 proceeds in the alternative to block B108 when the modulus value exceeds the first threshold level.

Block B108 entails recording a diagnostic code, e.g., DTC=1, indicative of the first threshold level having been exceeded. The method 100 then proceeds to block B110.

At block B110, the controller 50 may optionally compare the modulus value to one or more (N) additional, progressively higher calibrated threshold levels (CAL$_N$). In the example of FIG. 4B, for instance, the controller 50 may compare to level L3, and possibly to levels L4, L5, or additional thresholds. The method 100 repeats block B102 when none of the additional threshold levels are exceeded, and proceeds in the alternative to block B112.

Still referring to FIG. 5, and continuing with block B112, the method 100 may include determining whether the electric powertrain system 12 includes one or more additional electric machines 14, i.e., #M$_E$>1. Such information may be programmed into memory (M) of the controller 50. The method 100 proceeds to block B114 when the electric powertrain system 12 has one electric machine 14, and to block B116 in the alternative when more than one electric machine 14 is used, e.g., the electric machines 14 and 140 shown in FIG. 1.

Block B114 includes executing a first control action (CA #1) in response to the determination at block B112 that a single electric machine 14 is used as part of the electric powertrain system 12, and that at least one calibrated threshold level has been exceeded at block B110. The first control action includes changing a thermodynamic state of the electric powertrain system 12 via the controller 50 in response to the imbalance fault, as noted above. With just one electric machine 14, suitable control actions for execution in block B114 may include selectively increasing a rotary speed of the coolant pump 23 shown in FIG. 1 in response to the threshold variation exceeding a first threshold, e.g., level L2 of FIG. 4B. Such an action would have the effect of cooling the electric powertrain system 12 or components thereof, thus potentially avoiding the need for more aggressive or immediate control actions.

Although omitted for simplicity, block B114 of FIG. 5 could execute in a loop using measured temperatures or other values to control the rotary speed of the coolant pump 23, e.g., using closed-loop or open-loop feedback control. As set forth above, multiple different thresholds could be used at block B110, including a second threshold that exceeds the first threshold, e.g., L3 of FIG. 4B exceeding L2. In such a case, the method 100 may include selectively derating the electric machine 14. As appreciated in the art, derating actions are performed using switching control of the TPIM 25. As a result, the electric machine 14 is temporarily restricted to operation at reduced torque capability and/or speed. As part of such a control action, the operator of a motor vehicle 10 equipped with the electric powertrain system 12 of FIG. 1 may be notified of the reduced propulsion capability, as well as the possible need for maintenance. The method 100 then repeats block B102.

Block B116 includes executing a second control action (CA #2) in response to the determination at block B112 that at least two electric machines 14 are used as part of the electric powertrain system 12, and that at least one calibrated threshold level of the modulus value has been exceeded at block B110. In such a case, and using a simplified two-motor scenario in which the electric machine 14 is a nominal "first electric machine" and the electric machine 140 is a nominal "second electric machine", the controller 50 may identify, as a faulted motor, which one of a first or second electric machine is presently experiencing the threshold variation in the modulus value. The controller 50 may then selectively reduce a torque capability of the faulted motor in response to the threshold variation.

Additionally, when the electric powertrain system 12 is used aboard the motor vehicle 10 in which a load driven by the electric machines 14 and 140 includes a road wheel 22 of the motor vehicle 10, block B116 may include applying torque vectoring of the non-faulted motor to maintain a minimal wheel slip level of one or more of the road wheels 22. In an illustrative embodiment, the controller 50 may be programmed with a calibrated slip threshold. Torque from the non-faulted motor may be used to maintain minimal wheel slip, thereby compensating for the reduced performance of the electric machine 14 or 140 having the imbalance fault mitigated by the present teachings.

Those skilled in the art, in view of the foregoing disclosure, will appreciate that instructions embodying the method 100 or variations thereof may be recorded on a computer-readable medium. Execution of the instructions by the processor (PR) of a computer device, e.g., the controller 50 of FIG. 1, causes the processor (PR) to perform the method 100. For instance, execution of the instructions may cause the processor (PR) to receive the measured phase currents 13 from the plurality of current sensors 40, and to detect the threshold variation across the measured phase currents 13 during a predetermined testing interval in response to a commanded current and the measured phase currents.

In terms of the predetermined testing interval, the controller 50 may periodically execute the method 100 at a particular steady-state speed of the electric machine 14, such as when cruising at a particular speed. Doing so may enable the controller 50 to use a speed-specific set of thresholds for improved diagnostic accuracy. The controller 50 may be programmed with multiple different lookup tables in another embodiment, such that the controller 50 uses a corresponding set of threshold values when testing at a particular speed during the above-noted predetermined testing interval.

Additionally, execution of the instructions causes the controller 50 to change a thermodynamic state of the electrified powertrain system 12 in response to the imbalance fault, possibly including increasing a rotary speed of the coolant pump 23 (see FIG. 1) and/or derating the electric machine 14 of FIG. 1 via switching commands to the TPIM 25, e.g., as part of the inverter control signals (arrow $CC_{25}$).

The method 100 as described above is therefore usable for detecting phase current imbalance faults in a parallel winding motor, a non-limiting 8-winding per phase example of which is shown in FIG. 2. Such faults, whether due to aging, damage, or degradation from other causes, results from redirection of current around open circuit paths. The method 100 may be used to determine when the stator windings 42 are no longer balanced, using one or more calibratable thresholds. In addition to control actions such as thermal regulation and/or derating, diagnostic codes could be set to alert an operator to the need for service.

Since an open winding tends to accelerate degradation due to the increased loading on the remaining windings of a given phase, the approach enabled by the present method 100 provides additional time for scheduling service. For example, a rotary speed of the coolant pump 23 of FIG. 1 could be temporarily increased, as disclosed above, or other thermal regulation efforts could be taken to cool the electric powertrain system 12. Alternatively or concurrently, the electric machine 14 could be selectively derated to a degree commensurate with the particular threshold that is exceeded. Derating in this manner may help minimize stress on the remaining windings 42, with torque or speed limited as needed to prevent accelerated aging without requiring a loss of propulsion. These and other potential benefits will be readily appreciated by those of ordinary skill in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. An electric powertrain system comprising:
    a rotary electric machine having a rotor and a stator, wherein the stator has multiple phase legs, each respective one of the multiple phase legs including a single phase lead connected to two or more parallel stator windings, such that the stator has multiple phase leads collectively conducting a set of phase currents;

a rotary output member connected to the rotor and connectable to a load;

a traction power inverter module (TPIM) electrically connected to the multiple phase legs;

a plurality of current sensors configured to collectively measure the phase currents and, in response to the phase currents, to output measured phase currents, each respective current sensor of the plurality of current sensors being connected to a different one of the multiple phase leads; and a controller in communication with the plurality of current sensors and the TPIM, wherein the controller is configured, in response to a commanded current and the measured phase currents, to detect a threshold variation in the measured phase currents indicative of a phase current imbalance fault, and to selectively change a thermodynamic state of the electric powertrain system indicative of a broken or severed one of the parallel stator windings in response to the phase current imbalance fault, the thermodynamic state including (i) a regulated temperature of the electric powertrain system or components thereof, and/or (ii) an output torque and/or an output speed of the electric machine.

2. The electric powertrain system of claim 1, wherein the commanded current includes a d-axis current command and a q-axis current command, and wherein the controller is configured to detect the threshold variation as a function of the d-axis current command, the q-axis current command, and the measured phase currents.

3. The electric powertrain system of claim 2, wherein the function includes a unitless modulus value that normalizes the d-axis current command, the q-axis current command, and the measured phase currents, and wherein the unitless modulus value is expressed as:

$$\text{Modulus} = \left| 1 - \frac{\sqrt{2}}{\sqrt{3}} \frac{\sqrt{I_a^2 + I_b^2 + I_c^2}}{\sqrt{I_{d\_Cmd}^2 + I_{q\_Cmd}^2}} \right|$$

wherein the electric machine has three of the multiple phase legs, $I_a$, $I_b$, and $I_c$ are the measured phase currents, and $I_{d\_Cmd}$ and $I_{q\_Cmd}$ are the d-axis command and the q-axis command, respectively.

4. The electric powertrain system of claim 1, wherein the controller is configured to compare the threshold variation to multiple different thresholds of increasing fault severity, and to change the thermodynamic state of the electric powertrain system in a manner corresponding to the increasing fault severity.

5. The electric powertrain system of claim 4, further comprising:

a coolant pump configured to circulate a heat transfer fluid to the electric powertrain system, wherein the multiple different thresholds include a first threshold, and wherein the controller is configured to selectively increase a rotary speed of the coolant pump in response to the threshold variation exceeding the first threshold.

6. The electric powertrain system of claim 5, wherein the multiple different thresholds include a second threshold that exceeds the first threshold, and wherein the controller is configured to selectively derate the electric machine, via switching control of the TPIM, when the threshold variation exceeds the second threshold.

7. The electric powertrain system of claim 1, wherein the electric machine includes a first electric machine and a second electric machine, and the controller is configured to identify, as a faulted motor, which one of the first electric machine or the second electric machine is experiencing the threshold variation, and to selectively reduce a torque capability of the faulted motor in response to the threshold variation, and wherein the first electric machine or the second electric machine that is not the faulted motor is a non-faulted motor.

8. The electric powertrain system of claim 7, wherein the load includes a road wheel of a motor vehicle, and the controller is configured to apply torque vectoring of the non-faulted motor to maintain a minimal wheel slip level of the road wheel.

9. The electric powertrain system of claim 1, wherein the two or more parallel stator windings includes at least eight parallel stator windings for each respective one of the phase legs.

10. A method for detecting a threshold variation in measured phase currents of a rotary electric machine having a parallel-wound stator disposed with respect to a rotor, the rotor being connected to a load, the threshold variation being indicative of a phase current imbalance fault indicative of a broken or severed parallel stator winding of the electric machine, the method comprising:

measuring phase currents of the electric machine as the measured phase currents, via a plurality of current sensors, wherein each respective one of the current sensors is connected to a corresponding single phase lead of the stator such that the stator has multiple phase leads, wherein the multiple phase leads are respectively connected to two or more parallel stator windings;

detecting the threshold variation via a controller in response to a commanded current and the measured phase currents; and changing a thermodynamic state of an electric powertrain system via the controller in response to the imbalance fault, including changing (i) a regulated temperature of the electric powertrain system or components thereof, and/or (ii) an output torque and/or an output speed of the electric machine.

11. The method of claim 10, wherein detecting the threshold variation occurs as a function of a d-axis current command, a q-axis current command, and the measured phase currents, and wherein the commanded current includes the d-axis current command and the q-axis current command.

12. The method of claim 11, wherein the function includes a unitless modulus value that normalizes the d-axis current command, the q-axis current command, and the measured phase currents, and wherein detecting the threshold variation includes calculating the unitless modulus value as:

$$\text{Modulus} = \left| 1 - \frac{\sqrt{2}}{\sqrt{3}} \frac{\sqrt{I_a^2 + I_b^2 + I_c^2}}{\sqrt{I_{d\_Cmd}^2 + I_{q\_Cmd}^2}} \right|$$

wherein the electric machine has three of the multiple phase leads, $I_a$, $I_b$, and $I_c$ are the measured phase currents, and $I_{d\_Cmd}$ and $I_{q\_Cmd}$ are the d-axis command and the q-axis command, respectively.

13. The method of claim 10, further comprising:

comparing the threshold variation to multiple different thresholds of increasing fault severity, and changing the thermodynamic state of the electric powertrain system based on the increasing fault severity.

14. The method of claim 13, including a coolant pump configured to circulate a heat transfer fluid to the electric machine, wherein the multiple different thresholds includes a first threshold, the method further comprising:
selectively increasing a rotary speed of the coolant pump in response to the threshold variation exceeding the first threshold.

15. The method of claim 14, wherein the multiple different thresholds includes a second threshold that exceeds the first threshold, the method further comprising:
selectively derating the electric machine, via switching control of a traction power inverter module (TPIM) connected to the stator, when the threshold variation exceeds the second threshold.

16. The method of claim 10, wherein the electric machine includes a first electric machine and a second electric machine, the method further comprising:
identifying, as a faulted motor, which one of the first electric machine or the second electric machine is experiencing the threshold variation, and selectively reducing a torque capability of the faulted motor in response to the threshold variation.

17. The method of claim 16, wherein the load includes a road wheel of a motor vehicle, the method further comprising:
applying torque vectoring of whichever of the first electric machine or the second electric machine is not the faulted motor to thereby maintain a minimal wheel slip level of the road wheel.

18. The method of claim 10, wherein the two or more parallel stator windings includes at least eight parallel stator windings for each of the phase leads.

19. A computer-readable medium on which is recorded instructions for detecting a threshold variation in a set of measured phase currents of a polyphase rotary electric machine of an electric powertrain system, the electric machine having a parallel-wound stator disposed with respect to a rotor, the threshold variation being indicative of a phase current imbalance fault indicative of a broken or severed parallel stator winding of the stator, wherein execution of the instructions by a processor of a computer device causes the processor to:
receive the measured phase currents from a plurality of current sensors, each respective one of the current sensors being connected to a corresponding single phase lead of the stator, the stator having multiple phase leads each respectively connected to two or more parallel stator windings;
detect the threshold variation across the measured phase currents during a predetermined testing interval in response to a commanded current and the measured phase currents; and
selectively change a thermodynamic state of the electric powertrain system in response to the phase current imbalance fault, including (i) increasing a rotary speed of a coolant pump in fluid communication with the electric machine, (ii) derating the electric machine via switching commands to a traction power inverter module (TPIM) connected to the stator via the multiple phase leads, and/or (iii) changing an output torque and/or an output speed of the electric machine.

20. The computer-readable medium of claim 19, wherein the commanded current includes a d-axis current command and a q-axis current command, and wherein execution of the instructions causes the processor to calculate a unitless modulus value that normalizes the d-axis current command, a q-axis current command, and the measured phase currents, the unitless modulus value being expressed as:

$$\text{Modulus} = \left| 1 - \frac{\sqrt{2}}{\sqrt{3}} \frac{\sqrt{I_a^2 + I_b^2 + I_c^2}}{\sqrt{I_{d\_Cmd}^2 + I_{q\_Cmd}^2}} \right|$$

wherein the electric machine has three of the multiple phase leads, $I_a$, $I_b$, and $I_c$ are the set of phase currents, and $I_{d\_Cmd}$ and $I_{q\_Cmd}$ are the d-axis command and the q-axis command, respectively.

* * * * *